US011418665B2

(12) United States Patent
Nagata et al.

(10) Patent No.: US 11,418,665 B2
(45) Date of Patent: Aug. 16, 2022

(54) IMAGE READING APPARATUS AND IMAGE FORMING SYSTEM

(71) Applicant: CANON KABUSHIKI KAISHA, Tokyo (JP)

(72) Inventors: Teppei Nagata, Chiba (JP); Yukihiro Soeta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/245,166

(22) Filed: Apr. 30, 2021

(65) Prior Publication Data
US 2021/0368052 A1    Nov. 25, 2021

(30) Foreign Application Priority Data

May 19, 2020 (JP) .............................. JP2020-087090

(51) Int. Cl.
*H04N 1/04*    (2006.01)
*H04N 1/00*    (2006.01)
*G03G 15/22*   (2006.01)

(52) U.S. Cl.
CPC ..... *H04N 1/00615* (2013.01); *H04N 1/00588* (2013.01); *H04N 1/00602* (2013.01); *G03G 15/22* (2013.01)

(58) Field of Classification Search
CPC ........... H04N 1/00615; H04N 1/00588; H04N 1/00602; G03G 15/22
USPC .................................................. 358/498, 496
See application file for complete search history.

(56) References Cited

U.S. PATENT DOCUMENTS

| | | | | |
|---|---|---|---|---|
| 5,125,047 A | * | 6/1992 | Ito ............................ | H04N 1/03 355/68 |
| 2007/0070450 A1 | * | 3/2007 | Tanaka ............... | H04N 1/00909 358/498 |
| 2008/0158620 A1 | * | 7/2008 | Iwata .................. | H04N 1/00596 358/496 |
| 2009/0141314 A1 | * | 6/2009 | Yamamoto ............. | B41J 2/2146 358/443 |
| 2010/0225043 A1 | * | 9/2010 | Otobe .................. | B41J 13/0036 271/3.14 |
| 2013/0243451 A1 | | 9/2013 | Hirota et al. | |

FOREIGN PATENT DOCUMENTS

JP    2009-053346 A    3/2009

* cited by examiner

*Primary Examiner* — Cheukfan Lee
(74) *Attorney, Agent, or Firm* — Venable LLP

(57) ABSTRACT

An image reading apparatus includes a first conveyance roller, a second conveyance roller, a first conveyance guide, a second conveyance guide configured to move between an opposed position being opposed to the first conveyance guide and a retracting position being retracted from the opposed position, and an image reading unit opposed to the first conveyance guide and configured to move in a width direction orthogonal to the sheet conveyance direction and read image information on a sheet. The second conveyance guide is configured to move to the retracting position in response to the image reading unit moving in the width direction and reading the image information on the sheet.

17 Claims, 14 Drawing Sheets

FIG.5

Header:

size : 270176 bytes  prim.platform : 'APPL'
CMMType : 'appl'  flags : 0x00000000
version : 0x02002001  deviceManufacturer : 'EF1'
profileClose : 'prtr'  deviceModel : 0
dataColorSpace; 'CMYK'  deviceAttributes : 0x00000000, 0x00000000
interchangeSpace; 'XYZ',  renderingIntent : 2
CreationDate: 3.4.1996, 19:46:14  white XYZ : X=0.9642, Y=1.0000, Z=0.8249
CS23ignature : 'ascp'

Tag Table : <10 elements, double-click to inspect>

| Ind | Signet. | elementoffset | size |
|---|---|---|---|
| 0 | 'A2B0' | 252=0x000000FG | 43002 |
| 1 | 'A2A0' | 43256 = 0x0000A8F8 | 42940 |
| 2 | 'A2B1' | 86196 = 0x00015084 | 43002 |
| 3 | 'B2A1' | 129200 = 0x0001F880 | 42940 |
| 4 | 'A2B2' | 172140 = 0x0001A06G | 43002 |
| 5 | 'B2A2' | 215144 = 0x00034868 | 42940 |
| 6 | 'gamt' | 258084 = 0x0003F024 | 11925 |
| 7 | 'desc' | 270012 = 0x00041EBG | 125 |
| 8 | 'cprt' | 270140 = 0x00041F3G | 14 |
| 9 | 'wtpt' | 270156 = 0x00041F4G | 20 |

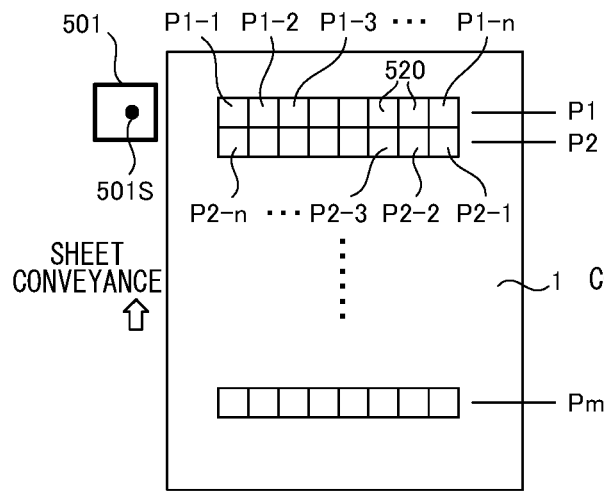
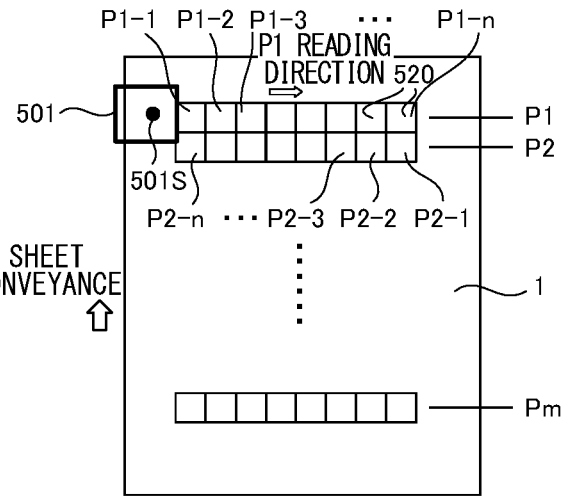
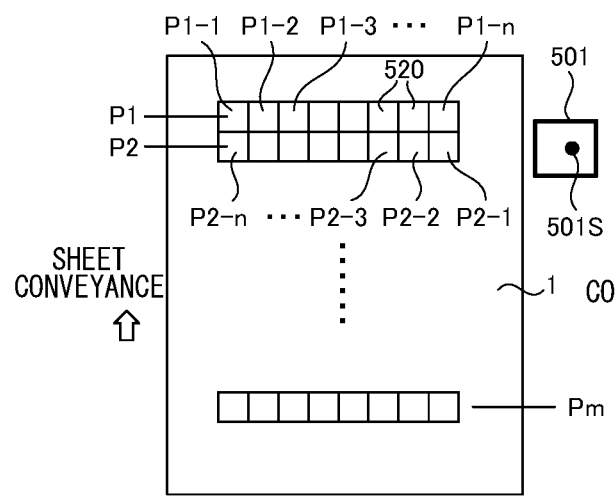
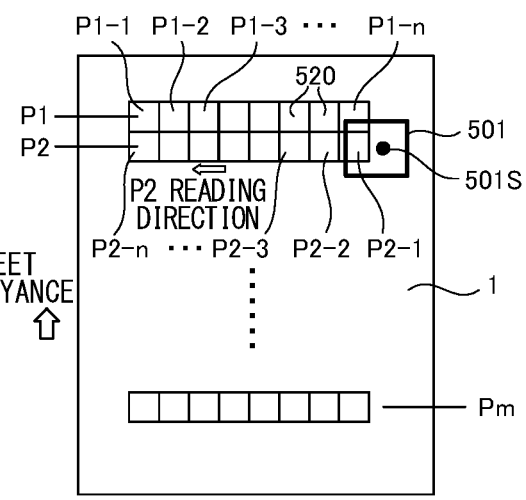
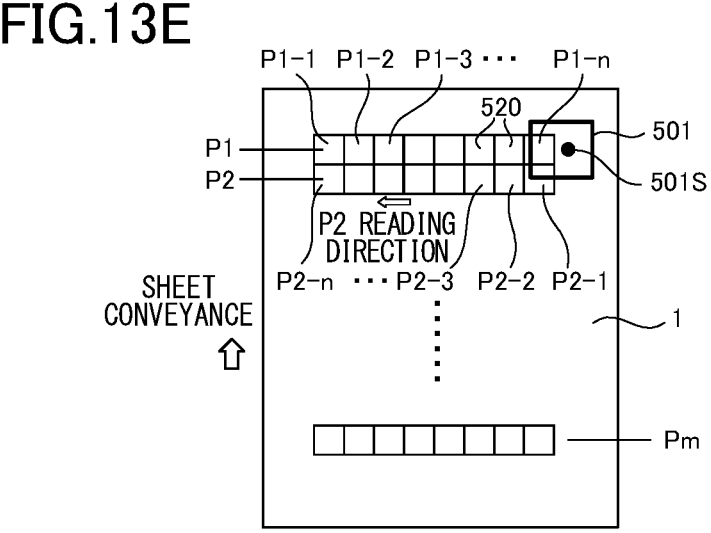

IMAGE READING APPARATUS AND IMAGE FORMING SYSTEM

BACKGROUND OF THE INVENTION

Field of the Invention

The present invention relates to an image reading apparatus for reading images on sheets, and an image forming system.

Description of the Related Art

There has been proposed an image forming system that forms an image on a sheet using an image forming apparatus, reads image information on the sheet by an image reading apparatus and then performs adjustment, especially color adjustment, of the image to be formed subsequently by the image forming apparatus (refer to U.S. Patent Application Publication No. 2013/0243451 and Japanese Patent Application Laid-Open Publication No. 2009-53346). The image forming system disclosed in U.S. Patent Application Publication No. 2013/0243451 and Japanese Patent Application Laid-Open Publication No. 2009-53346 detects patch images formed on the sheet by a color sensor to create a profile and performs color adjustment based on the profile.

The image forming system disclosed in U.S. Patent Application Publication No. 2013/0243451 includes a fixed color sensor, so that only the patch image aligned at a corresponding position in a main scanning direction, i.e., width direction of a sheet, can be read. Therefore, it is necessary to arrange a number of color sensors in a row in the main scanning direction in order to read a large number of patch images on a sheet or to determine uniformity of density in the main scanning direction. However, since the color sensor is not inexpensive, the cost of the system is increased thereby.

It is possible to adopt the system disclosed in Japanese Patent Application Laid-Open Publication No. 2009-53346 in which the color sensor is moved in the main scanning direction. However, when moving the color sensor in a sheet width direction serving as the main scanning direction, a guide member that defines a sheet conveyance path interferes with the color sensor, but without the guide member, the possibility of sheet jamming is increased.

SUMMARY OF THE INVENTION

The present invention provides an image reading apparatus and an image forming system that can read image information on a sheet by moving an image reading unit in a width direction and can reduce occurrence of sheet jam.

According to one aspect of the present invention, an image reading apparatus configured to read image information on a sheet discharged from an image forming apparatus that forms an image on a sheet, includes a first conveyance roller configured to convey a sheet, a second conveyance roller arranged downstream of the first conveyance roller in a sheet conveyance direction and configured to convey the sheet, a first conveyance guide configured to form a sheet conveyance path between the first conveyance roller and the second conveyance roller in the sheet conveyance direction, a second conveyance guide configured to move between an opposed position where the second conveyance guide is opposed to the first conveyance guide and forms the sheet conveyance path and a retracting position where the second conveyance guide retracts from the opposed position, and an image reading unit opposed to the first conveyance guide and configured to move in a width direction orthogonal to the sheet conveyance direction and read the image information on the sheet. The second conveyance guide is at the retracting position when the image reading unit moves in the width direction and reads the image information on the sheet.

Further features of the present invention will become apparent from the following description of exemplary embodiments with reference to the attached drawings.

BRIEF DESCRIPTION OF THE DRAWINGS

FIG. 5 is a diagram illustrating an ICC profile.

FIG. 13A illustrates a state where the color sensor is at a pre-reading position.

FIG. 13B illustrates a state where the color sensor starts reading patches of row P1.

FIG. 13C illustrates a state where the color sensor has finished reading patches of row P1.

FIG. 13D illustrates a state where the color sensor starts reading patches of row P2.

FIG. 13E illustrates a state where the color sensor starts reading patches of row P1 again.

DESCRIPTION OF THE EMBODIMENTS

An image reading apparatus and an image forming system according to the respective embodiments will be described with reference to the drawings. Size, material, shape and relative arrangement of components illustrated in the following description of embodiments are not intended to limit the scope of the present technique unless specifically denoted.

First Embodiment

General Configuration of Image Forming System

Figure 1:
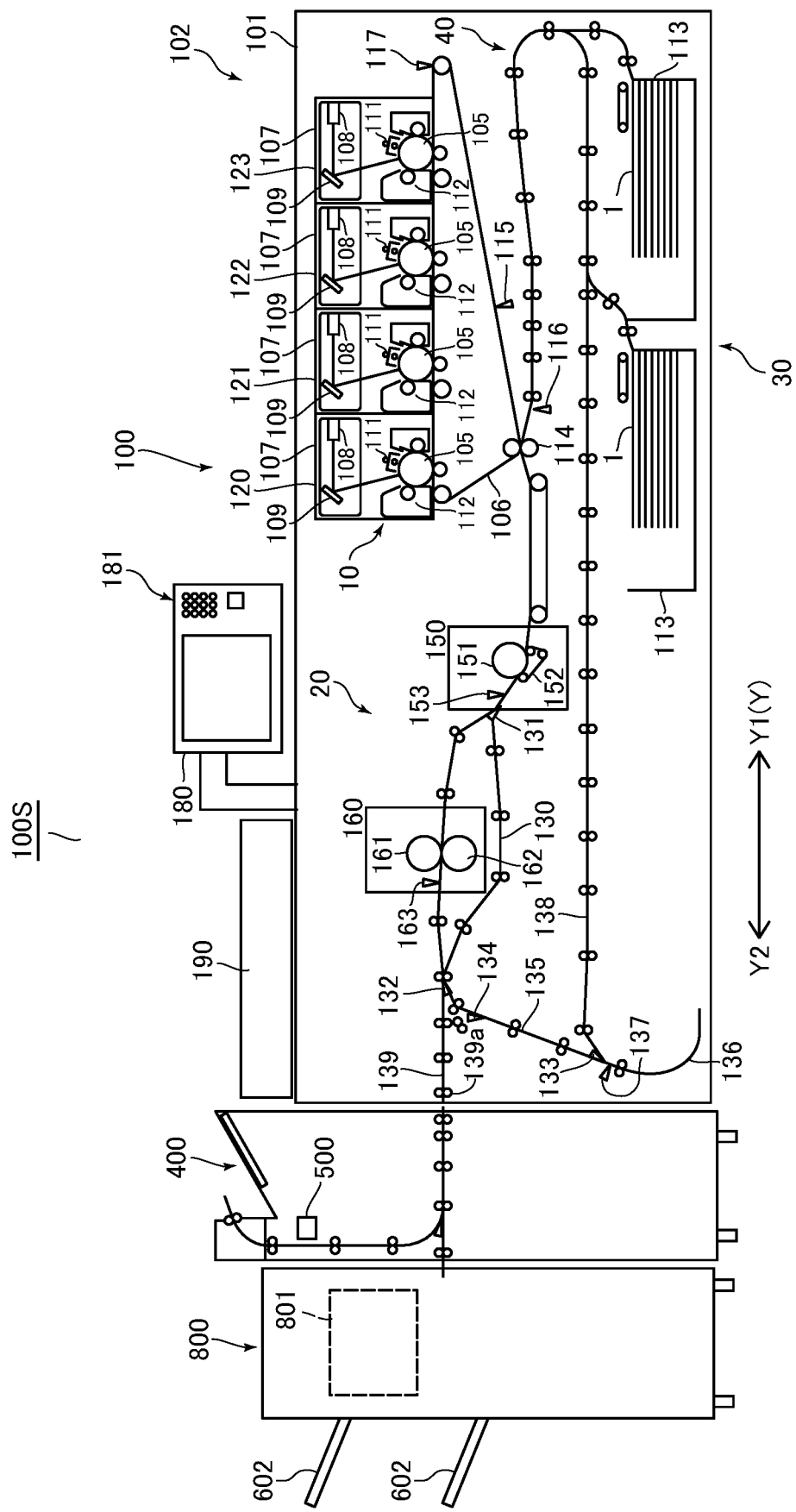
FIG. 1 is a schematic view of an image forming system according to a first embodiment.

FIG. 1 is a schematic view illustrating an image forming system 100S according to a first embodiment. The image forming system 100S includes an image forming apparatus 100, an adjustment unit 400, and a finisher 800. The image forming apparatus 100, which is an electrophotographic laser beam printer, is illustrated as an example of the image forming apparatus according to the present embodiment, but the present embodiment is not limited thereto, and can also be applied to an inkjet printer or a sublimation printer. Further, the adjustment unit 400 is an image reading apparatus according to the present embodiment.

An image forming engine 102, and a control board storage portion (not shown) that stores a printer controller 103 (refer to FIG. 4) for controlling the operation of the image forming system 100S are installed in a casing 101 of the image forming apparatus 100. The image forming engine 102 serving as an image forming unit includes an optical processing mechanism 10 and a fixing processing mechanism 20 for forming an image on a recording material through an image forming process, and a feed processing mechanism 30 and a conveyance processing mechanism 40 for feeding and conveying a sheet 1 having a rectangular shape used as the recording material. Normal paper, thick paper, surface-treated paper such as coated paper or embossed paper, plastic film, cloth or any other type of sheet can be used as the recording material.

The optical processing mechanism 10 includes stations 120, 121, 122 and 123 for forming toner images of respective colors of yellow, magenta, cyan and black, and an intermediate transfer belt 106. In the respective stations 120 to 123, a surface of a photosensitive drum 105 which is a drum-shaped photosensitive member is charged by a primary charger 111. A laser scanner unit 107 carries out an exposure processing of the photosensitive drum 105 based on an instruction signal created based on image data and transmitted to the laser scanner unit 107. The laser scanner unit 107 includes a laser driver that drives laser light emitted from a semiconductor laser (not shown) on and off. The laser scanner unit 107 conducts laser light from the semiconductor laser via a rotating polygon mirror to distribute the laser light in a main scanning direction, i.e., width direction of the sheet, while conducting the laser light via a reflecting mirror 109 to the photosensitive drum 105. Thereby, an electrostatic latent image corresponding to image data is formed on the surface of the photosensitive drum 105.

A developing unit 112 stores developer containing toner in an interior thereof and supplies charged toner particles to the photosensitive drum 105. Toner particles are attached to the drum surface in accordance with surface potential distribution, by which an electrostatic latent image borne on the photosensitive drum 105 is visualized as toner image. The toner image borne on the photosensitive drum 105 is transferred, i.e., primarily transferred, to the intermediate transfer belt 106 to which a voltage of opposite polarity as a normal charge polarity of toner is applied. When forming a color image, toner images formed by the four stations 120 to 123 are transferred in multiple layers in a superposed manner to the intermediate transfer belt 106, by which a full-color toner image is formed on the belt.

Meanwhile, the feed processing mechanism 30 feeds sheets 1 one at a time toward a transfer roller 114 from a sheet storage cassette 113 that has been inserted in a drawable manner to the casing 101 of the image forming apparatus 100. The toner image borne on the intermediate transfer belt 106 serving as an intermediate transfer body is transferred, i.e., secondarily transferred, to the sheet 1 by the transfer roller 114.

An image formation start position detection sensor 115 that determines a print start position for performing image formation, a feed timing sensor 116 for determining a feed timing of the sheet 1, and a density sensor 117 are arranged in the circumference of the intermediate transfer belt 106. The density sensor 117 measures a density of a test patch image borne on the intermediate transfer belt 106. The printer controller 103 adjusts operating conditions of the optical processing mechanism 10, such as settings of a charge target potential of the primary charger 111 or a bias voltage of the developing unit 112, based on the detection result of the density sensor 117.

The fixing processing mechanism 20 according to the present embodiment is composed of a first fixing unit 150 and a second fixing unit 160. The first fixing unit 150 includes a fixing roller 151 for heating the sheet 1, a pressurization belt 152 for enabling pressure-contact of the sheet 1 to the fixing roller 151, and a first post-fixing sensor 153 for detecting completion of a fixing process by the first fixing unit 150. The fixing roller 151 is a hollow roller having a heater arranged therein. The first fixing unit 150 nips and conveys the sheet 1 by the fixing roller 151 and the pressurization belt 152 constituting a rotary member pair and applies heat and pressure to a toner image formed on the sheet. Thereby, toner particles are melted and then hardened, by which the image is fixed to the sheet 1.

The second fixing unit 160 is arranged downstream of the first fixing unit 150 in a conveyance path of the sheet 1. The second fixing unit 160 has a function to enhance glossiness of the image subjected to the fixing process by the first fixing unit 150 or to ensure fixity of the image to the sheet 1. The second fixing unit 160 includes, similar to the first fixing unit 150, a fixing roller 161 and a pressure roller 162 serving as a rotary member pair for heating and pressing the sheet 1 while conveying the same, and a second post-fixing sensor 163 that detects completion of the fixing process by the second fixing unit 160.

There are cases where the sheet 1 is not required to pass through the second fixing unit 160, depending on the sheet type. To cope with such cases, the image forming apparatus 100 includes a detour conveyance path 130 for discharging the sheet 1 without passing through the second fixing unit 160 with the aim to reduce energy consumption. The sheet 1 sent out from the first fixing unit 150 is guided to either the second fixing unit 160 or the detour conveyance path 130 by a first changeover flapper 131.

The sheet 1 having passed through the second fixing unit 160 or the detour conveyance path 130 is guided to either a discharge conveyance path 139 or a reverse conveyance path 135 by a second changeover flapper 132. The sheet 1 conveyed to the reverse conveyance path 135 is subjected to position detection by a reverse sensor 137, and a downstream end, i.e., leading edge, and an upstream end, i.e., trailing edge, of the sheet in a sub-scanning direction, that is, the direction in which the sheet is conveyed, are switched by a switchback operation performed by a reverse portion 136. In the case of duplex printing, the sheet 1 having an image formed on a front side has its leading edge and trailing edge switched by the reverse portion 136 and is passed through a third changeover flapper 133 and via a reconveyance path 138 to the transfer roller 114 again, where an image is formed on a rear side which is opposite to the front side thereof.

The sheet 1 to which one-side printing has been completed or the sheet 1 to which image forming on a rear side in duplex printing has been completed is discharged to an outer side of the image forming apparatus 100 by a sheet discharge roller 139a serving as a discharge portion provided on the discharge conveyance path 139. A fourth changeover flapper 134 capable of guiding the sheet 1 having been subjected to switchback by the reverse portion 136 toward the discharge conveyance path 139 is provided between the reverse conveyance path 135 and the discharge conveyance path 139, enabling the user to select which face of the sheet 1 is faced upward when being discharged from the image forming apparatus. Further, an image reading apparatus 190 that reads image information on a document is provided on an upper portion of the image forming apparatus 100.

General Configuration of Adjustment Unit

Next, a general configuration of the adjustment unit 400 serving as an image reading apparatus according to the present embodiment for reading image information on a sheet discharged from the image forming apparatus 100 will be described. Image qualities of an image forming apparatus include graininess, in-plane homogeneity, character definition and color reproducibility (including color stability), and it is said that the most important image quality is color reproducibility. A person has memories related to expected colors (especially of human skin tone, blue sky, metal, etc.) based on experience, and can feel uncomfortable if a color is out of an acceptable range thereof. Such colors are called memory colors, and the reproducibility thereof is considered to be important when a photograph or the like is output. Further, the demands for color reproducibility (including stability) of image forming apparatuses are increasing among users, not only in regard to memory colors but also to users in offices who feel uncomfortable with differences between the color on the monitor and printed color or users in the field of graphic arts who pursue color reproducibility of CG images.

In the image forming system 100S according to the present embodiment, color adjustment, or color calibration, is carried out based on a profile in a state where the image forming apparatus 100 forms an image on a sheet. Specifically, when performing color adjustment, the image forming system 100S forms patches 520 (refer to FIG. 3) on the sheet 1 by the image forming apparatus 100. Thereafter, the adjustment unit 400 reads the patches 520 formed on the sheet 1 to perform colorimetry and sends the result of colorimetry as image information to the image forming apparatus 100 as a feedback. The image forming apparatus 100 creates a profile based on the result of colorimetry received from the adjustment unit 400 and performs color adjustment based thereon when forming an image of a job on the sheet 1. The image forming system 100S according to the present embodiment can improve the image quality by performing such color adjustment.

In the image forming system 100S according to the present embodiment, the adjustment unit 400 is installed between the image forming apparatus 100 and the finisher 800 in the horizontal direction, that is, in the right-left direction of FIG. 1. That is, in the present embodiment, the device arranged upstream of the adjustment unit 400 is the image forming apparatus 100 and the device arranged downstream of the adjustment unit 400 is the finisher 800. The finisher 800 includes a processing portion 801 for carrying out a cutting process for cutting off a blank space of a sheet, a binding process and a saddle-stitch process, and discharges the sheet or the sheet bundle subjected to processing, or the sheet received from the upstream device if no processing is required, as a product of the image forming system 100S.

The upstream device and the downstream device of the adjustment unit 400 vary according to the configuration of the image forming system 100S. For example, the adjustment unit 400 is not necessarily directly connected to the image forming apparatus 100, and an intermediate unit can be arranged between the image forming apparatus 100 and the adjustment unit 400, the adjustment unit 400 being designed to receive the sheets from the intermediate unit. One example of the intermediate unit is a device for carrying out a coating process of attaching transparent toner on an image surface of the sheet to which the image has been formed to provide glossiness. Further, a sheet processing apparatus other than the finisher 800 can be connected downstream of the adjustment unit 400. Examples of the sheet processing apparatus include an inserter for inserting a sheet serving as a front page to the sheet bundle, or a stacker capable of storing and moving a large amount of products on a carriage.

Figure 2:
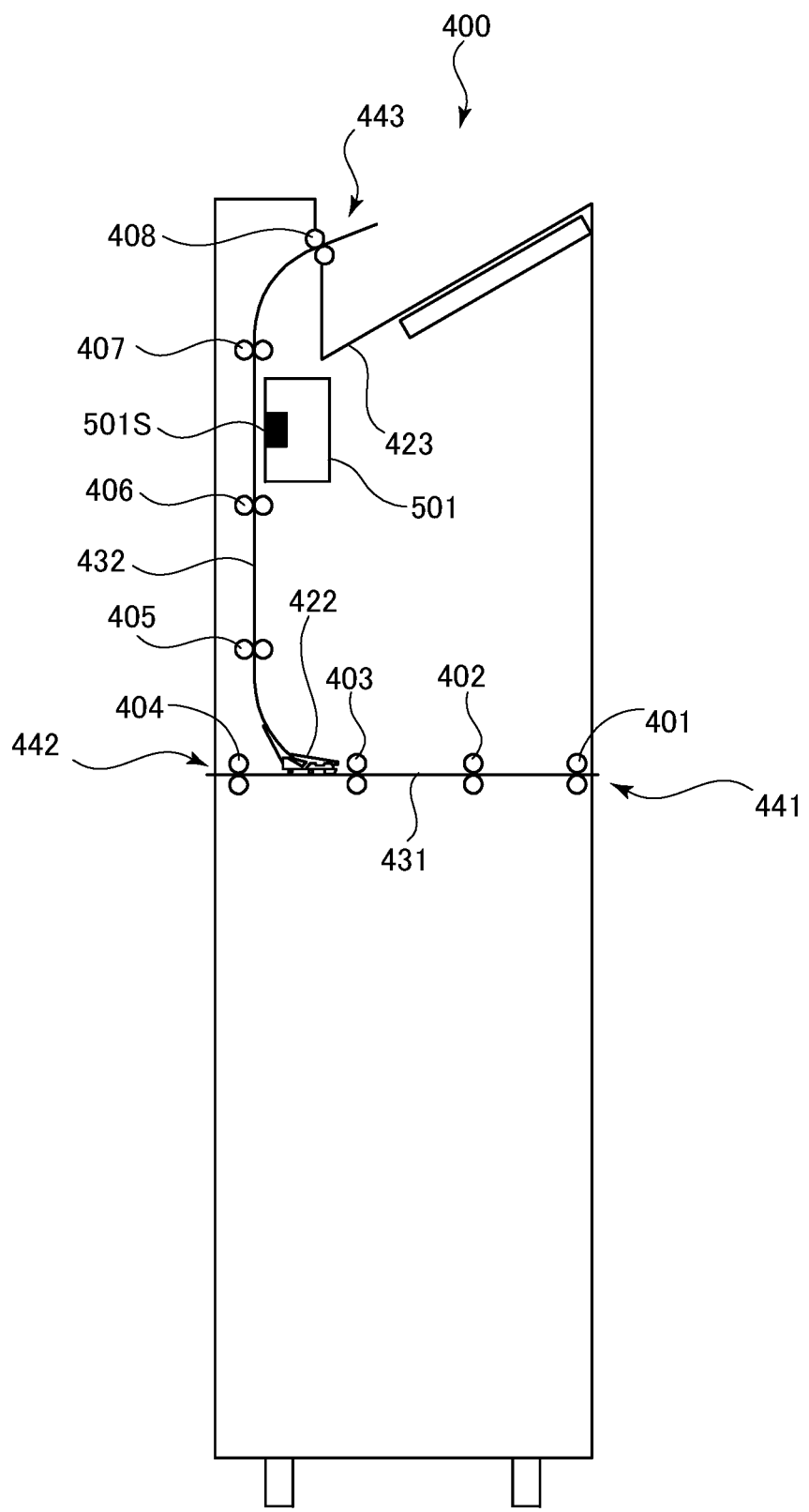
FIG. 2 is a schematic view of an adjustment unit according to the first embodiment.

As illustrated in FIG. 2, the adjustment unit 400 includes an inlet 441 through which the sheet discharged from the image forming apparatus 100 is received in the adjustment unit 400, and a first sheet discharge port 442 through which the sheet is discharged toward the finisher 800 (refer to FIG. 1). The adjustment unit 400 includes a through-path 431 formed to linearly connect the inlet 441 and the first sheet discharge port 442 in an approximately horizontal direction, and a sheet discharge path 432 formed to branch upward from a halfway point of the through-path 431. The adjustment unit 400 further includes a second sheet discharge port 443 through which the sheet received through the inlet 441 is discharged via the sheet discharge path 432 to the exterior of the apparatus, and a sheet discharge tray 423 provided on an upper portion of the adjustment unit 400 onto which the sheet discharged from the second sheet discharge port 443 is placed.

Conveyance roller pairs 401, 402, 403 and 404 for conveying sheets received through the inlet 441 are provided on the through-path 431, and the sheet is conveyed by the roller pairs from the first sheet discharge port 442 to the finisher 800. Further, a changeover flapper 422 serving as a guiding member capable of switching the conveyance path of the sheet having been conveyed on an upstream part of the through-path 431 between the downstream portion of the through-path 431 and the sheet discharge path 432 is provided at a branching portion between the sheet discharge path 432 and the through-path 431. Further, the sheet discharge path 432 includes conveyance roller pairs 405, 406, 407 and 408 for conveying sheets, and conveys the sheets from the second sheet discharge port 443 toward the sheet discharge tray 423.

Further, a colorimetry unit 500 is arranged along the sheet discharge path 432 between the conveyance roller pair 406 serving as an example of the first conveyance roller positioned upstream in the sheet conveyance direction and the conveyance roller pair 407 serving as an example of the second conveyance roller positioned downstream in the sheet conveyance direction. A color sensor 501 serving as an image reading unit movable in a width direction orthogonal to the sheet conveyance direction and reading the image information on the sheet by a reading unit 501S is provided in the colorimetry unit 500, as described in detail later.

Figure 3:
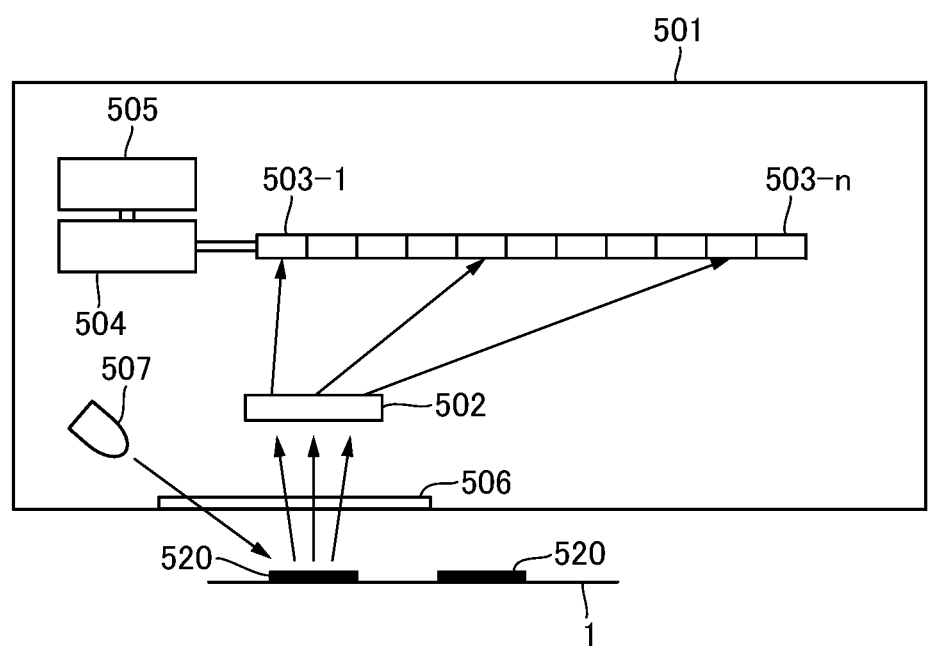
FIG. 3 is a diagram illustrating a configuration of a color sensor.

As illustrated in FIG. 3, the color sensor 501 includes a white LED 507 for irradiating the patches 520 of toner serving as image information formed on the sheet 1 with light, and a diffraction grating 502 that splits light reflected by the patches 520 by wavelength. Further, the color sensor 501 includes a lens 506 for condensing light irradiated from the white LED 507 on the patches 520 on the sheet 1 and condensing light reflected by the patches 520 on the diffraction grating. Further, the color sensor 501 is provided with a line sensor 503 (503-1 to 503-$n$) including n elements for detecting light split by the diffraction grating 502 by wavelength. The color sensor 501 includes a calculation unit 504 for performing various kinds of computation from a light intensity value of each element detected by the line sensor 503, and a memory 505 for storing various data. The calculation unit 504 has, for example, a spectrum computing unit for performing spectrum computation from a light intensity value, and a Lab computing portion for computing a Lab value.

Control Configuration of Image Forming System

Figure 4:
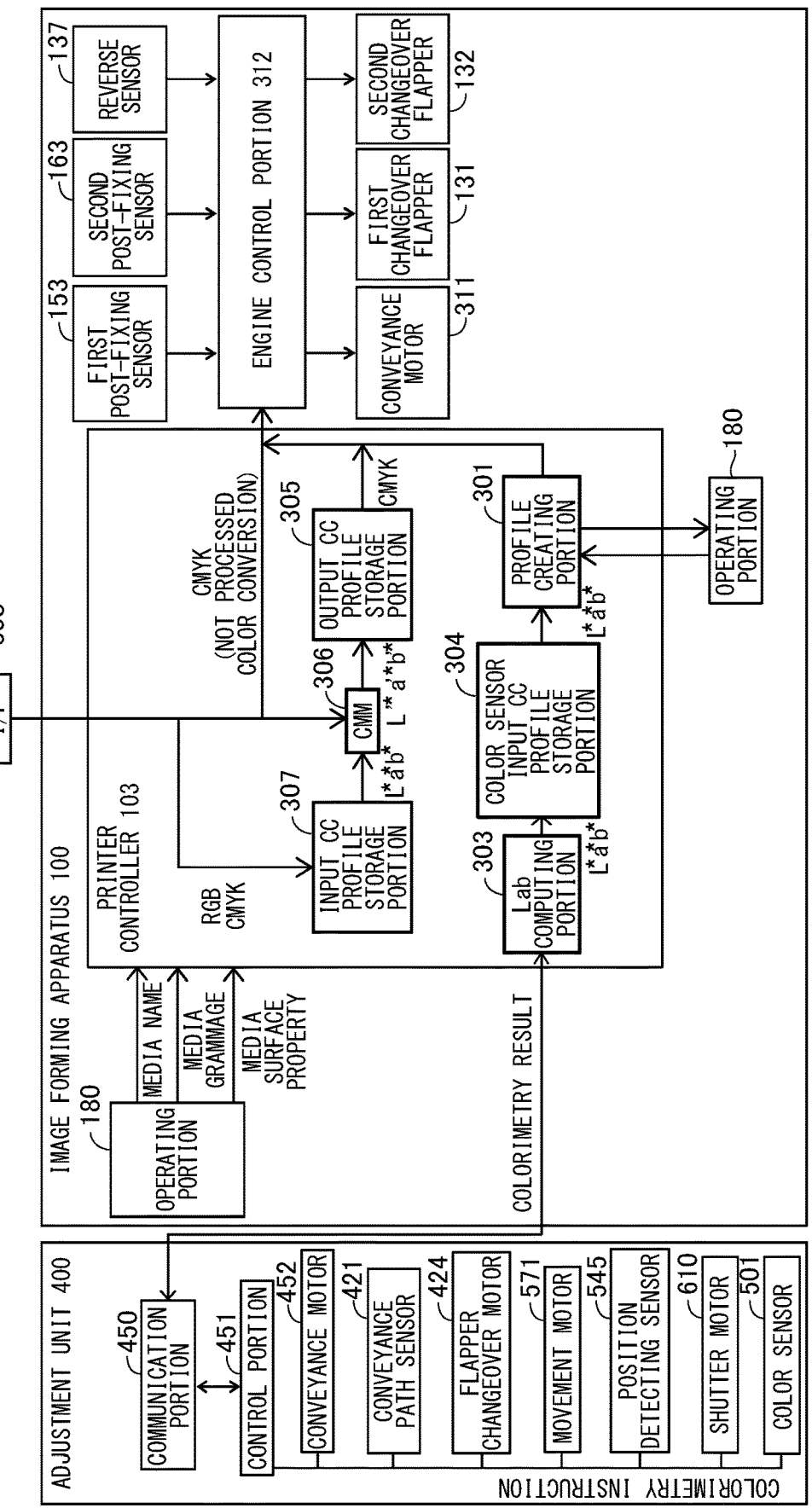
FIG. 4 is a block diagram illustrating a control configuration of an image forming system.

As illustrated in FIG. 4, the image forming apparatus 100 includes a printer controller 103 serving as a control unit for executing integrated control of the operation of the image forming system 100S (refer to FIG. 1), and an engine control portion 312 for controlling the image forming engine 102 (refer to FIG. 1). The printer controller 103 is a control board implementing at least one processor and a memory.

The engine control portion 312 causes the image forming engine 102 to execute the above-mentioned image forming process based on an instruction signal from the printer controller 103, for example, and form an image on the sheet. For example, the engine control portion 312 controls operations of a conveyance motor 311 for driving a roller conveying the sheet, the first changeover flapper 131 and the second changeover flapper 132 based on the detection signals from the first post-fixing sensor 153, the second post-fixing sensor 163 and the reverse sensor 137.

The image forming apparatus 100 is provided with an operating portion 180 serving as a user interface of the image forming system 100S (refer to FIG. 1). The operating portion 180 includes a display serving as a display unit for displaying information for the user. Further, the operating portion 180 includes physical keys such as a ten-key pad and a print execute button and a touch panel function of the display as input units allowing the user to enter instructions and data to the image forming system 100S. By operating the operating portion 180, the user can enter information related to sheet attribute, such as the name, grammage and presence of surface processing of the sheets stored in a certain sheet storage cassette 113 (refer to FIG. 1) to the printer controller 103.

The printer controller 103 is connected to an external wired or wireless communication network via an external interface (I/F) 308 and can communicate with an external computer (not shown). The printer controller 103 is connected to the image forming apparatus 100 and also connected to a control circuit of a device composing the image forming system 100S, which according to the present embodiment are the adjustment unit 400 and the finisher 800. The printer controller 103 communicates with these devices and coordinates the operations of the image forming apparatus 100 and the respective devices.

The adjustment unit 400 is provided with a control portion 451 serving as a control unit and a communication portion 450 for controlling the communication of the control portion 451 with the above-mentioned printer controller 103. Further, a conveyance motor 452 for driving the conveyance roller pairs 401, 402, 403, 404, 405, 406, 407 and 408 is connected to the control portion 451, and conveyance of the sheet is controlled by the drive of the conveyance motor 452 being controlled by the control portion 451. A conveyance path sensor 421 is connected to the control portion 451, enabling to detect conveyance of the sheet to the sheet discharge path 432.

Further, a flapper changeover motor 424 is connected to the control portion 451, and changeover of the changeover flapper 422 is controlled by controlling the drive of the flapper changeover motor 424 by the control portion 451. In other words, whether to convey the sheet as it is through the through-path 431 or to convey the sheet through the sheet discharge path 432 can be switched. Further, a movement motor 571 and a position detecting sensor (described later), a shutter motor 610, and the color sensor 501 mentioned earlier are connected to the control portion 451.

Color Adjustment of Image Formation

Color adjustment, that is, configuration for performing feedback, of image formation in a state where the patches 520 on the sheet 1 are subjected to colorimetry by a color sensor 51 will be described in detail. That is, a control flow for creating a profile and outputting an image using the profile in the image forming apparatus 100 according to the present embodiment will be described. An ICC (International Color Consortium) profile that has been used widely in the market as a profile for realizing a superior color reproducibility is adopted in the description. The present embodiment has been illustrated using the ICC profile, but the present technology is not limited thereto. Other than the ICC profile, a CRD (Color Rendering Dictionary) that is adopted from level 2 of PostScript proposed by Adobe Inc. or a color separation table used in Photoshop can be used. Further, a CMYK simulation of ColorWise proposed by EFI Inc. that maintains black print information can also be used.

The adjustment unit 400 according to the present embodiment is installed with the color sensor 501 serving as a reading unit capable of measuring spectral reflectance. The adjustment unit 400 can measure the spectral reflectance and convert the same into chromaticity to create a color conversion profile by itself. Then, the adjustment unit 400 carries out an internal color conversion processing using the created color conversion profile.

Color Sensor Measurement and Chromaticity Computation

Now, a formula for computing chromaticity will be described. The signal entering and subjected to colorimetry by a spectroscopic sensor is light irradiated from a white LED on an object of measurement, the reflected light thereof being dispersed by diffraction grating and becomes a spectral reflectance that is detected by CMOS sensors arranged at respective wavelength regions between 380 nm and 720 nm. According to the present embodiment, in order to enhance detection computation accuracy, spectral reflectance is converted through use of color matching functions into L*a*b* in accordance with CIE regulations. Then, the patch information converted into L*a*b* and the relationship with the signal value of the patch are obtained to create an ICC profile serving as a color conversion profile.

L*a*b* Calculation

The following illustrates a method for calculating a chromaticity value (L*a*b*) based on spectral reflectance (defined in ISO 13655).

a. Acquire spectral reflectance $R(\lambda)$ of sample (380 nm to 780 nm)
b. Prepare color-matching functions $x(\lambda)$, $y(\lambda)$ and $z(\lambda)$ and standard light spectral distribution SD50 $(\lambda)$ (*1)

The color-matching functions are defined in JIS Z8701 and SD50 (λ) is defined in JIS Z8720, also referred to as auxiliary standard illuminant D50.

c. R (λ)×SD50 (λ)×x (λ), R (λ)×SD50 (λ)×y (λ), R (λ)× SD50 (λ)×z (λ)

d. Integrate respective wavelengths $$\Sigma\{R(\lambda) \times SD50(\lambda) \times x(\lambda)\}$$

$$\Sigma\{R(\lambda) \times SD50(\lambda) \times y(\lambda)\}$$

$$\Sigma\{R(\lambda) \times SD50(\lambda) \times z(\lambda)\}$$

e. Integrate respective wavelengths of product of color-matching function y (λ) and standard light spectral distribution SD50 (λ)

$$\Sigma\{SD50(\lambda) \times y(\lambda)\}$$

f. Calculate XYZ $$X = 100 \times \Sigma\{SD50(\lambda) \times y(\lambda)\} / \Sigma\{R(\lambda) \times SD50(\lambda) \times x(\lambda)\}$$

$$Y = 100 \times \Sigma\{SD50(\lambda) \times y(\lambda)\} / \Sigma\{R(\lambda) \times SD50(\lambda) \times y(\lambda)\}$$

$$Z = 100 \times \Sigma\{SD50(\lambda) \times y(\lambda)\} / \Sigma\{R(\lambda) \times SD50(\lambda) \times z(\lambda)\}$$

g. Calculate L*a*b*

$$L^* = 116 \times (Y/Yn)^{(1/3)} - 16$$

$$a^* = 500\{(X/Xn)^{(1/3)} - (Y/Yn)^{(1/3)}\}$$

$$b^* = 200\{(Y/Yn)^{(1/3)} - (Z/Zn)^{(1/3)}\}$$

When $Y/Yn > 0.008856$,
Xn, Yn and Zn are tristimulus values of standard light $$(X/Xn)^{(1/3)} = 7.78(X/Xn)^{(1/3)} + 16/116$$

$$(Y/Yn)^{(1/3)} = 7.78(Y/Yn)^{(1/3)} + 16/116$$

$$(Z/Zn)^{(1/3)} = 7.78(Z/Zn)^{(1/3)} + 16/116$$

Profile Creation Processing

When a customer engineer replaces components, before carrying out a JOB that requires a color-matching accuracy or when a user needs to check a color tone of a final output product at a design planning stage, the user can operate the operating portion 180 to perform a color profile creation processing.

The profile creation processing is performed in the printer controller 103 illustrated in the control block diagram of FIG. 4. At first, an instruction to create profile is entered via the operating portion 180 to a profile creating portion 301. The profile creating portion 301 sends a signal to the engine control portion 312 to output a CMYK (Cyan, Magenta, Yellow and Black) color chart, which is an ISO12642 test form, without a profile. At the same time, the profile creating portion 301 transmits a colorimetry instruction to the control portion 451.

In the image forming apparatus 100, processes such as charging, exposure, development, transfer and fixing are executed to transfer and fix the ISO12642 test form, or patches 520, to the sheet 1, and the sheet 1 is conveyed to the adjustment unit 400 and subjected to colorimetry by the color sensor 501. Spectral reflectance data of the patches 520 subjected to colorimetry is entered to the printer controller 103, converted into L*a*b* data by a Lab computing portion 303, stored in a color sensor input ICC profile storage portion 304, and entered to the profile creating portion 301. Note that the Lab computing portion 303 may convert the spectral reflectance data into a CIE1931XYZ color system, which is a color space signal other than L*a*b* and that does not depend on machines.

The profile creating portion 301 creates an output ICC profile based on a relationship between the CMYK signal having been output and the L*a*b* data having been entered and stores the created output ICC profile in place of an output ICC profile stored in an output ICC profile storage portion 305. The ISO12642 test form contains a patch of a CMYK color signal that covers a color reproducible area that can be output by general copying machines, and a color conversion table is created based on a relationship between color signal values of respective colors and L*a*b* values obtained by colorimetry. That is, a CMYK-to-Lab conversion table (A2Bx tag) is created. Based on this conversion table, a reverse conversion table (B2Ax tag) is created.

FIG. 5 shows a configuration of the ICC profile, including a header, tags, and data thereof. The tags include a color conversion table tag, a white point (Wtpt), a tag (gamt) for describing whether a color expressed by a Lab value defined inside a profile is in or out of a reproducible range that can be reproduced by the hard copy thereof.

A profile creation instruction can be entered from a PC or other externally connected apparatus via an external interface 308. In that case, the created output ICC profile may be uploaded from the external apparatus outputting the instruction, and a user can perform color conversion with an application program corresponding to the ICC profile.

Color Conversion Processing

A color conversion for a normal color output will be described. An image signal input based on an assumption of an RGB signal input from a scanner portion via the external interface 308 or a standard print CMYK signal value such as JapanColor is transmitted to an input ICC profile storage portion 307 for external input. The input ICC profile storage portion 307 performs RGB-to-L*a*b or CMYK-to-L*a*b conversion according to the image signal input from the external interface 308. The input ICC profile is constituted of a one-dimensional LUT (look-up table) for controlling gamma of an input signal, a multicolor LUT called direct mapping, and a one-dimensional LUT for controlling gamma of generated conversion data. The input image signal is converted from color space that depends on the device into L*a*b* data that does not depend on devices using these look-up tables.

The image signal converted into L*a*b* chromaticity coordinates is input to a CMM (color management module) 306. The CMM 306 performs GUMAT conversion for mapping mismatch between read color space of the external interface 308 such as a scanner portion serving as an input device and an output color reproducible range of the image forming apparatus 100 serving as an output device. The CMM 306 also performs color conversion for adjusting mismatch between a light source type at the time of input and a light source type used when an output is observed, also called mismatch in color temperature setting, and black color discrimination. Thus, the L*a*b data is converted into L*'a*'b*' data and entered to the profile storage portion 305. The profile created as a result of the steps described above is stored in the profile storage portion 305, so that color conversion is performed based on the newly created ICC profile to convert the data into a CMYK signal that depends on the output device, and the converted CMYK signal is output to the engine control portion 312.

As described above, the ICC profile is created based on (read) image information subjected to colorimetry at the color sensor 501 of the adjustment unit 400, and the image being formed on the sheet 1 is corrected based thereon by the image forming engine 102 of the image forming apparatus 100. Thereby, color adjustment performing feedback based on the patches 520 of the sheet 1 can be executed.

Figure 6:
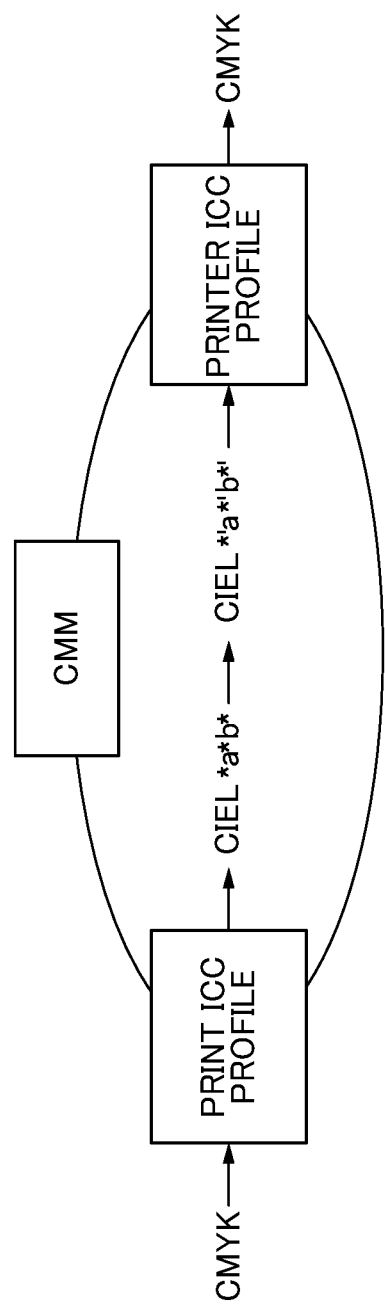
FIG. 6 is a schematic drawing illustrating a color management environment.

In block configuration, the CMM 306 is separated from the input ICC profile storage portion and the output ICC profile storage portion. However, as illustrated in FIG. 6, the CMM refers to a module that governs color management and that performs color conversion using an input profile and an output profile.

Colorimetry Unit Configuration

Figure 7:
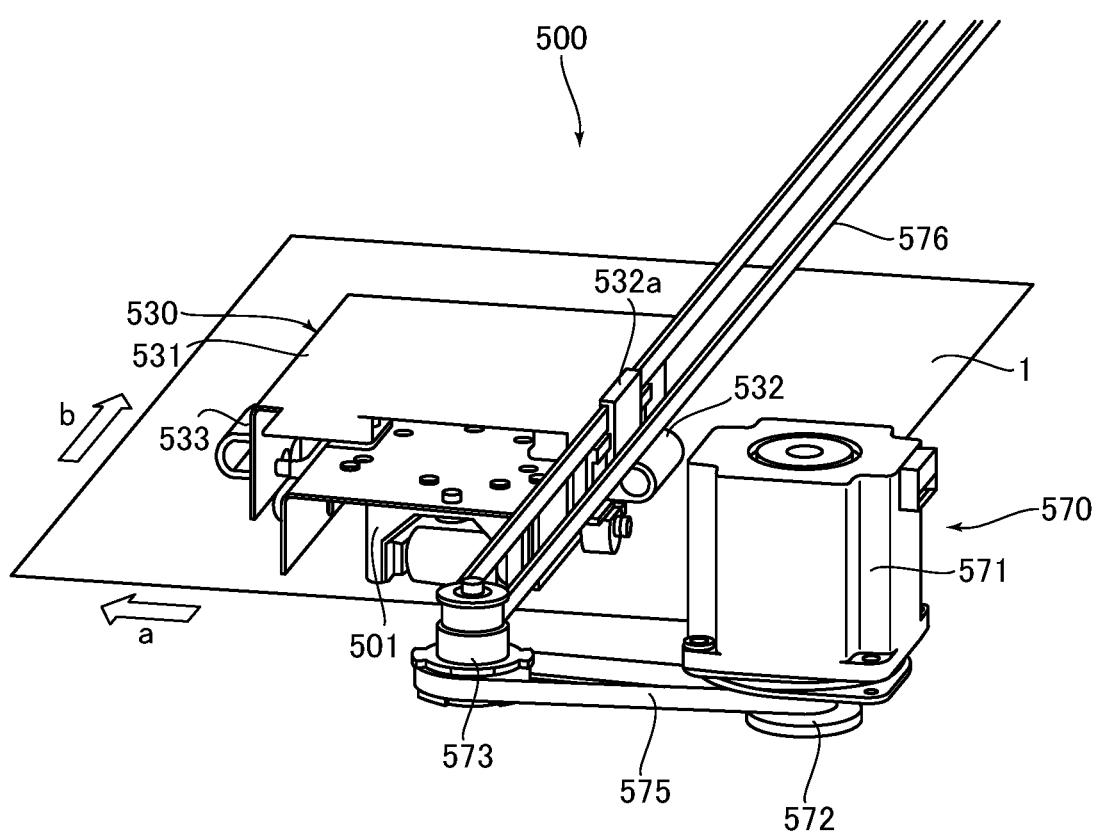
FIG. 7 is a perspective view illustrating a part of the color sensor and a movable unit.
Figure 8:
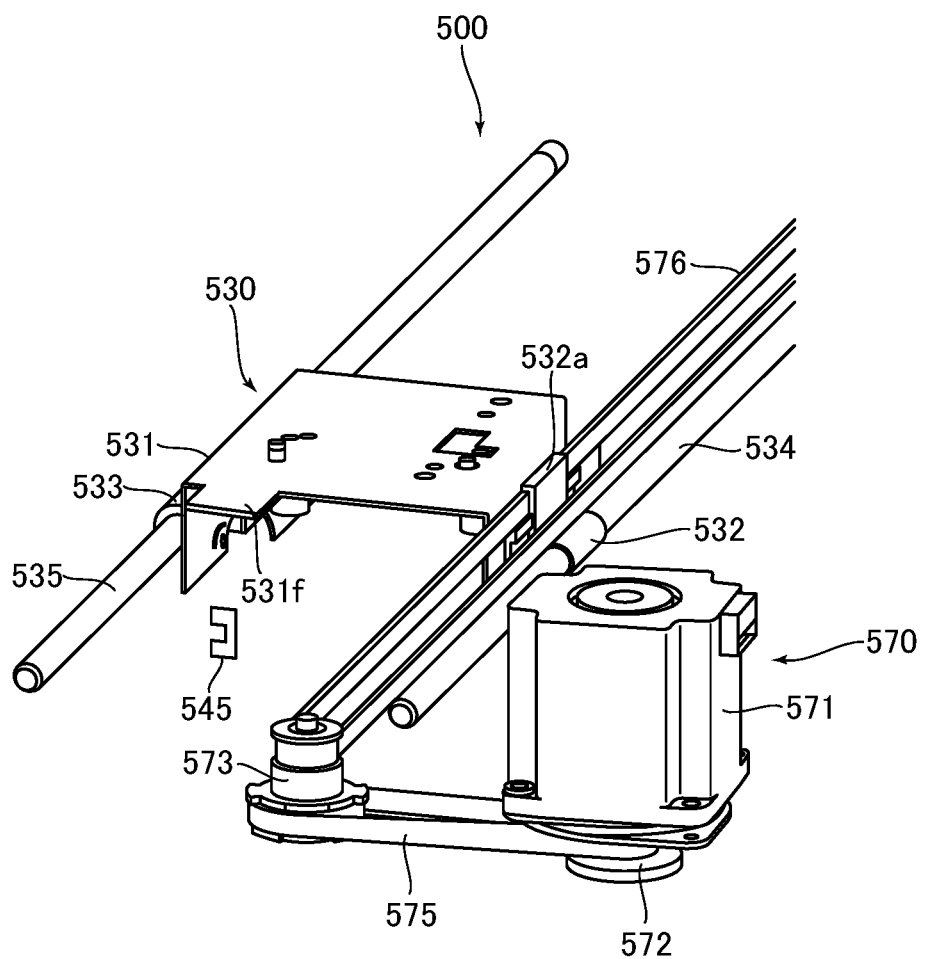
FIG. 8 is a perspective view illustrating the movable unit.

Now, a configuration of the colorimetry unit 500 will be described with reference to FIGS. 7 and 8. As illustrated in FIGS. 7 and 8, the colorimetry unit 500 is mainly composed of a movable unit 530 and a drive unit 570. The movable unit 530 includes the color sensor 501 and a movable support plate 531 that supports the color sensor 501. The movable support plate 531 is provided with a movable bearing 532 arranged upstream in a sheet conveyance direction (arrow a) and a movable bearing 533 arranged downstream in the sheet conveyance direction. Further, an engaging plate 532a is formed facing up on the movable bearing 532, and a tooth flank (not shown) of the engaging plate 532a is engaged with a tooth flank formed on a moving belt 576 (described later). The movable bearing 532 is slidably engaged with a supporting shaft 534 supported in a fixed manner to a frame (not shown) of the adjustment unit 400 and arranged in parallel to a sheet width direction (arrow b) that is orthogonal to the sheet conveyance direction. Further, the movable bearing 533 is similarly slidably engaged to a supporting shaft 535 supported in a fixed manner to the frame (not shown) of the adjustment unit 400 and arranged in parallel to the sheet width direction (arrow b) that is orthogonal to the sheet conveyance direction.

The drive unit 570 is composed of the movement motor 571, a first pulley 572, a second pulley 573, a linkage belt 575 and a moving belt 576. The first pulley 572 is fixed to an output shaft (not shown) of the movement motor 571 and driven to rotate by the movement motor 571. The linkage belt 575 is stretched across the first pulley 572 and the second pulley 573, and the moving belt 576 is stretched across the second pulley 573 and a third pulley (not shown). Thereby, when the movement motor 571 is driven, the moving belt 576 is driven to rotate via the first pulley 572, the linkage belt 575 and the second pulley 573. As described, since the tooth flank of the moving belt 576 is engaged with the tooth flank of the engaging plate 532a of the movable unit 530, the movable unit 530 is controlled to be moved in the sheet width direction (arrow b) by the movement motor 571.

The position detecting sensor 545 is formed of an optical sensor, for example, and detects a presence of a flag portion 531f formed on the movable support plate 531 of the movable unit 530 by turning on/off. For example, the position detecting sensor 545 is arranged to be turned on when the movable unit 530 is positioned on the outer side in the sheet width direction of the sheet discharge path 432, and this position is detected as a home position. The movement motor 571 is formed of a stepping motor, for example, and the movement motor 571 is subjected to pulse control by detecting the on state of the position detecting sensor 545, based on which the position of the movable unit 530 in the sheet width direction is controlled.

Configuration of Conveyance Unit and Guide Shutter Device

Figure 9:
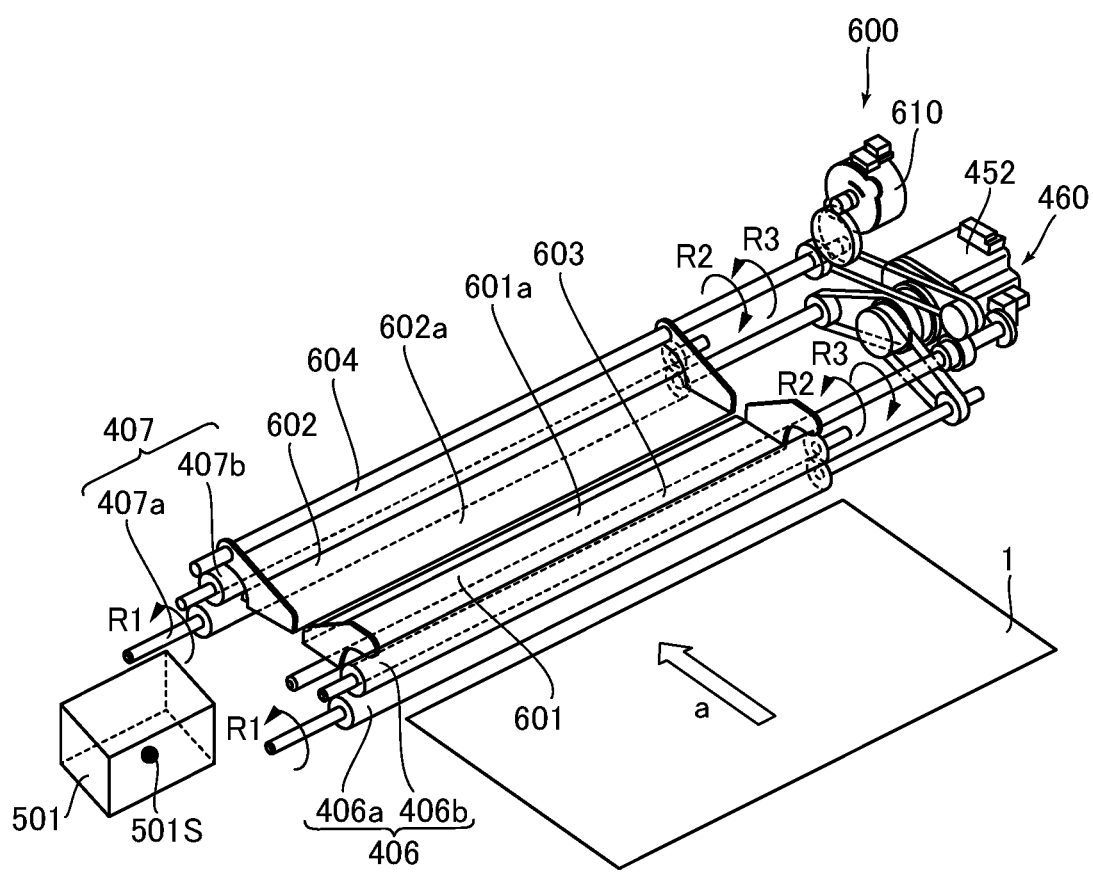
FIG. 9 is a perspective view illustrating a guide shutter device, a conveyance unit and a color sensor according to the first embodiment.

Next, a configuration of a conveyance unit 460 and a guide shutter device 600 will be described with reference to FIGS. 9, 10 and 12. At first, the conveyance unit 460 will be described. As illustrated in FIG. 9, the conveyance unit 460 mainly includes a conveyance roller pair 406 arranged upstream in the sheet conveyance direction and a conveyance roller pair 407 arranged downstream in the sheet conveyance direction of the color sensor 501, and the conveyance motor 452 that drives the conveyance roller pairs 406 and 407 to rotate. The conveyance roller pair 406 is composed of a pair of rollers formed of a drive roller 406a and a driven roller 406b, the driven roller 406b being pressed against the drive roller 406a by a spring (not shown) to form a nip for nipping and conveying a sheet. Similarly, the conveyance roller pair 407 is composed of a pair of rollers formed of a drive roller 407a and a driven roller 407b, the driven roller 407b being pressed against the drive roller 407a by a spring (not shown) to form a nip for nipping and conveying a sheet.

The drive rollers 406a and 407a are formed by providing a urethane coating having a thickness of 30 μm to an outer circumference of a pipe formed of an aluminum material, and the outer diameter thereof is 20 mm. Both ends of each of the drive rollers 406a and 407a are supported rotatably by bearings (not shown). The driven rollers 406b and 407b are formed by winding silicon rubber around a roller surface of an aluminum material, and the outer diameter thereof is 20 mm. Similarly, both ends of each of the driven rollers 406b and 407b are supported rotatably by bearings (not shown).

Figure 10:
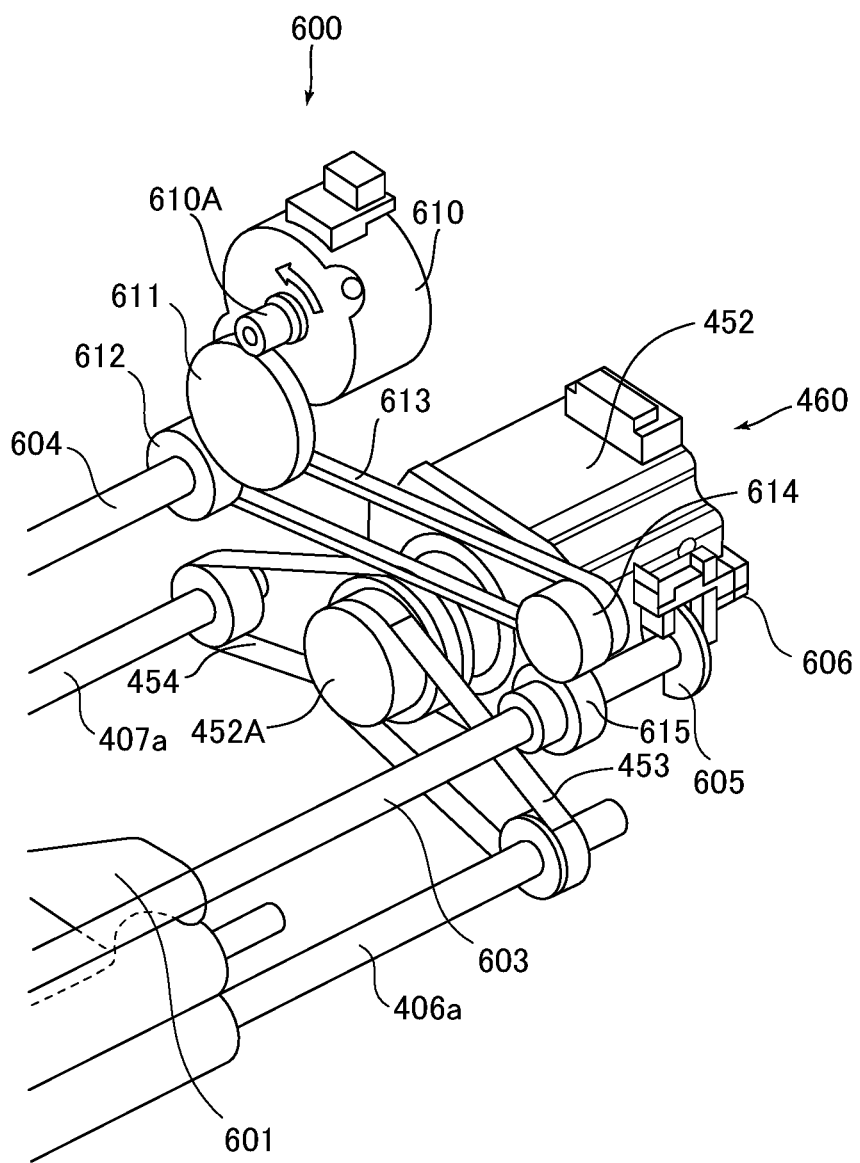
FIG. 10 is an enlarged perspective view illustrating a drive system of the guide shutter device and a drive system of the conveyance unit.

As illustrated in FIG. 10, a transmission belt 453 is stretched across an output shaft 452A of the conveyance motor 452 and the drive roller 406a, and a transmission belt 454 is stretched across the output shaft 452A of the conveyance motor 452 and the drive roller 407a. Thereby, when the conveyance motor 452 is driven, the drive rollers 406a and 407a are driven to rotate in the direction of arrow R1 illustrated in FIG. 9 to convey the sheet 1 in the sheet conveyance direction illustrated by arrow a. The present embodiment illustrates an example where the conveyance roller pair 406 and the conveyance roller pair 407 are driven by one conveyance motor 452, but the conveyance roller pairs 406 and 407 can also be driven by separate motors.

Next, the guide shutter device 600 will be described. As illustrated in FIG. 9, the guide shutter device 600 is mainly composed of an upstream guide shutter 601, an upstream rotation shaft 603, a downstream guide shutter 602, a downstream rotation shaft 604, and the shutter motor 610 for driving the same. The upstream guide shutter 601 is composed of a steel sheet having a thickness of 1 mm, the upstream guide shutter 601 including a guide portion 601a that forms the sheet discharge path 432 serving as a sheet conveyance path and constituting an upstream guide surface capable of guiding the sheet 1 (refer to FIG. 12A). Similarly, the downstream guide shutter 602 is also composed of a steel sheet having a thickness of 1 mm, the downstream guide shutter 602 including a guide portion 602a that forms the sheet discharge path 432 serving as the sheet conveyance path and constituting a downstream guide surface capable of guiding the sheet 1 (refer to FIG. 12A). According to the present embodiment, the upstream guide shutter 601 and the downstream guide shutter 602 constitute a second conveyance guide, the upstream guide shutter 601 constituting an upstream rotary guide member and the downstream guide shutter 602 constituting a downstream rotary guide member.

The upstream guide shutter 601 is fixed to the upstream rotation shaft 603, and the upstream rotation shaft 603 is supported rotatably by a bearing (not shown) to a frame of the adjustment unit 400. In other words, the upstream guide shutter 601 is rotated around the upstream rotation shaft 603 that serves as a fulcrum. Similarly, the downstream guide shutter 602 is fixed to the downstream rotation shaft 604, and the downstream rotation shaft 604 thereof is supported rotatably by a bearing (not shown) to a frame of the adjustment unit 400. In other words, the downstream guide shutter 602 is rotated around the downstream rotation shaft 604 that serves as a fulcrum.

As illustrated in FIG. 10, a tooth flank that is meshed with a gear 611 is formed on an outer circumference of an output shaft 610A of the shutter motor 610, and the gear 611 is meshed with a gear pulley 612 in which a gear and a pulley are formed integrally. The gear pulley 612 is fixed to the downstream rotation shaft 604. Meanwhile, a gear 615 is fixed to the upstream rotation shaft 603, and the gear 615 is meshed with a gear pulley 614 in which a gear and a pulley are formed integrally, wherein the rotation of the gear pulley 614 is reversed and transmitted to the upstream rotation shaft 603. A transmission belt 613 is stretched across the pulley part of the gear pulley 612 and the gear pulley 614, and the gear pulleys 612 and 614 are rotated in the same direction by the drive of the shutter motor 610. Therefore, when the shutter motor 610 is driven in one direction, as illustrated in FIG. 9, the upstream rotation shaft 603 and the downstream rotation shaft 604 are rotated in the direction of arrow R2. In contrast, when the shutter motor 610 is driven in the other direction, the upstream rotation shaft 603 and the downstream rotation shaft 604 are rotated in the direction of arrow R3.

Figure 12A:
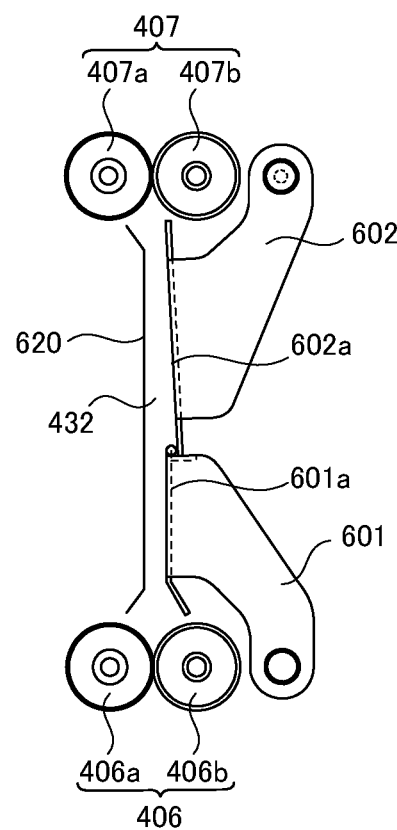
FIG. 12A is a side view illustrating a state where an upstream guide shutter and a downstream guide shutter of the guide shutter device according to the first embodiment define a sheet conveyance path.

The upstream guide shutter 601 and the downstream guide shutter 602 of the guide shutter device 600 configured as described form the sheet discharge path 432 between the conveyance roller pair 406 arranged upstream and the conveyance roller pair 407 arranged downstream, as illustrated in FIG. 12A. That is, the upstream guide shutter 601 and the downstream guide shutter 602 form the sheet discharge path 432 serving as a sheet conveyance path by the guide portion 601a and the guide portion 602a being connected at opposing positions opposed to a guide plate 620 that is fixed immovably as a first conveyance guide. That is, the guide plate 620 forms one side of the sheet conveyance path, that is, the sheet discharge path 432, and the guide portion 601a connected to the guide portion 602a forms the other side of the sheet conveyance path. In the state where the guide portions 601a and 602a are in their opposed positions, the downstream end of the guide portion 601a is positioned closer to the guide plate 620 than the upstream end of the guide portion 602a, so that sheet jamming is less likely to occur.

Figure 12B:
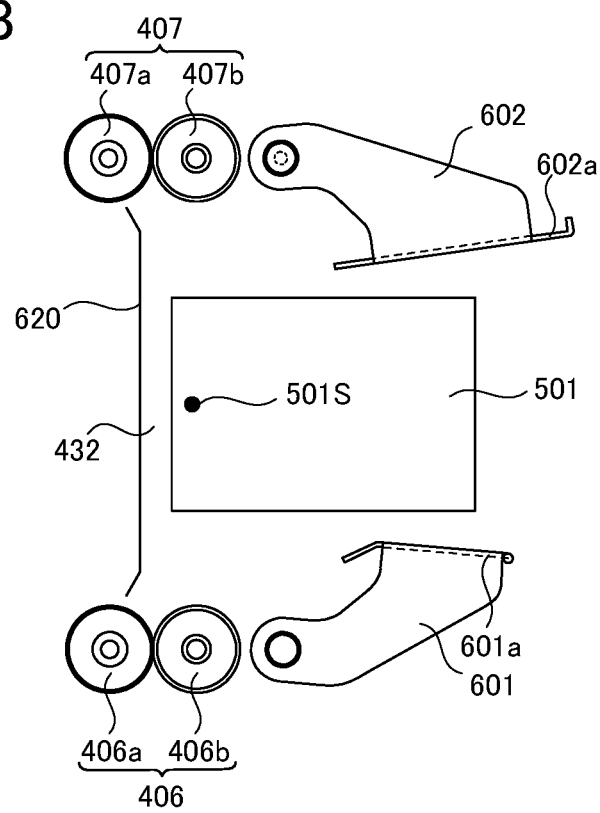
FIG. 12B is a side view illustrating a state where the upstream guide shutter and the downstream guide shutter of the guide shutter device according to the first embodiment are retracted from the sheet conveyance path.

Then, as illustrated in FIG. 9, the upstream guide shutter 601 and the downstream guide shutter 602 are driven to rotate by the shutter motor 610 in the direction of arrow R3. Then, as illustrated in FIG. 12B, the guide portions 601a and 602a are moved to a retracting position retracted from the opposed positions opposed to the guide plate 620, in other words, the upstream guide shutter 601 and the downstream guide shutter 602 are retracted from the positions defining the sheet conveyance path. Thereby, as described above, the color sensor 501 or the movable support plate 531 of the movable unit 530 can be moved, or passed, in the sheet conveyance direction between the upstream guide shutter 601 and the downstream guide shutter 602 in their retracting positions.

Thereafter, as illustrated in FIG. 9, in a state where the upstream guide shutter 601 and the downstream guide shutter 602 are driven by the shutter motor 610 to rotate in the direction of arrow R2, as illustrated in FIG. 12A, the guide portions 601a and 602a are returned to their opposed positions. Thereby, the sheet discharge path 432 is formed as a space defined by the guide plate 620 and the guide portions 601a and 602a in a closed state as a sheet conveyance path.

Further, as illustrated in FIG. 10, a flag portion 605 formed in a chipped tooth shape is fixed to an end portion of the upstream rotation shaft 603, and, for example, a reference position of the flag portion 605 is detected by the on and off of a rotational position detecting sensor 606 formed of an optical sensor. The rotational position detecting sensor 606 is turned on in a state where the upstream guide shutter 601 illustrated in FIG. 12A is in the opposed position, which is detected as the home position. The shutter motor 610 is composed of a stepping motor and the like subjected to pulse control from detection of the on state of the rotational position detecting sensor 606, and the positions of the upstream guide shutter 601 and the downstream guide shutter 602 are thereby controlled.

In the present embodiment, an example where the upstream guide shutter 601 and the downstream guide shutter 602 are driven by one shutter motor 610 is described, but the upstream guide shutter 601 and the downstream guide shutter 602 can also be driven by separate motors.

Arrangement of Cooling Fan

Figure 11:
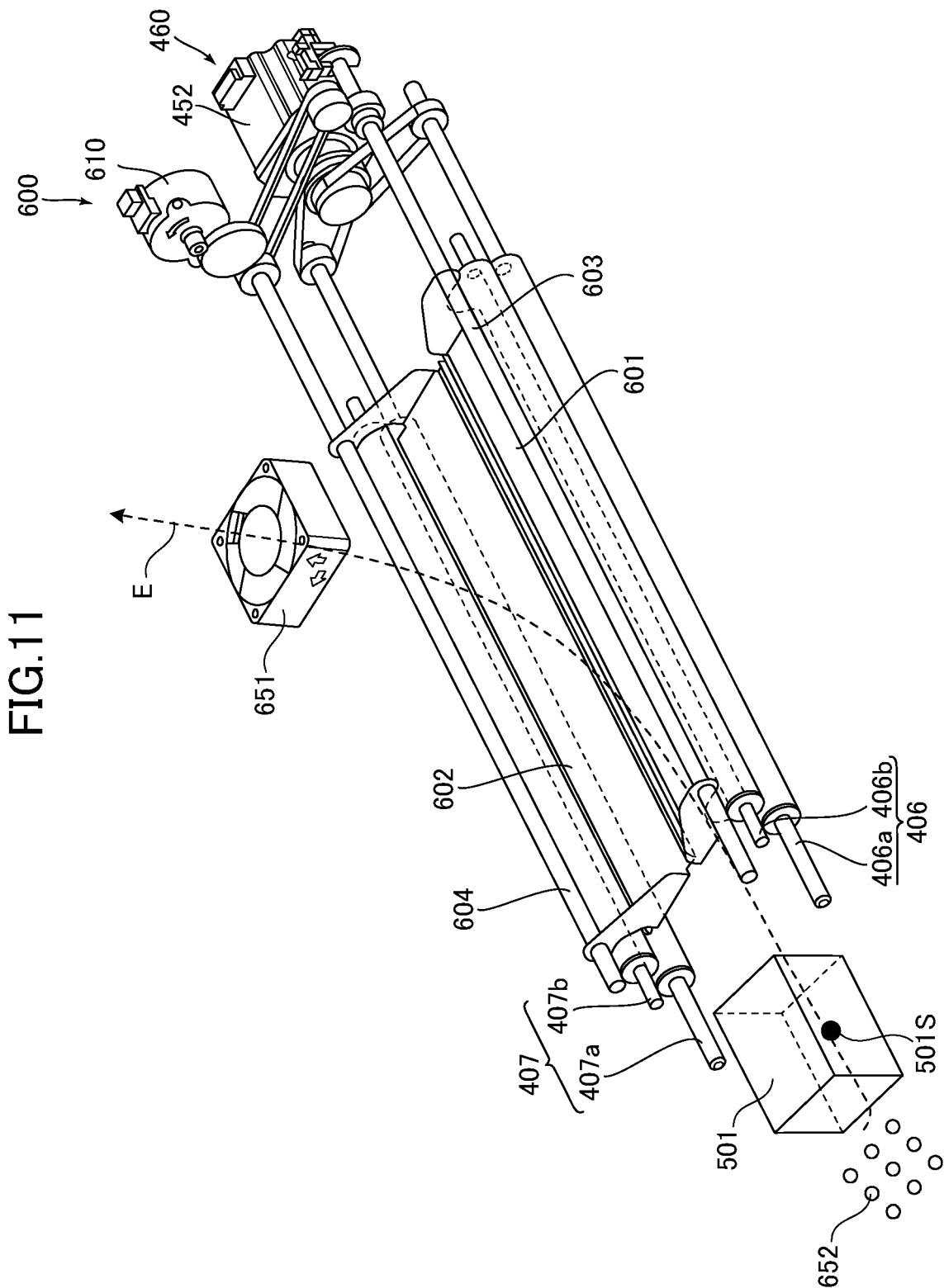
FIG. 11 is a perspective view illustrating a positional relationship of the guide shutter device, the conveyance unit, the color sensor and a cooling fan.

Now, a cooling fan 651 and flow of air will be described with reference to FIG. 11. As shown in FIG. 11, the cooling fan 651 is formed of a 60-mm axial fan, for example, arranged near a longitudinal center position in the sheet conveyance direction in which the movable unit 530 of the colorimetry unit 500 moves. Further, the air intake port 652 is provided, for example, on a front side of the adjustment unit 400 close to a position where the color sensor 501 is at the home position, that is, a position where the color sensor 501 has moved to an outer side in the sheet width direction of the sheet discharge path 432. Therefore, when the cooling fan 651 blows air, air is flown as shown by arrow E to cool the color sensor 501.

Colorimetry Job Operation

Next, a colorimetry job operation of reading the patches 520 on the sheet 1 by the color sensor 501 will be described with reference to FIGS. 12 and 13. The patches 520 including m rows of patches P1 to Pm are formed on the sheet 1 by the image forming apparatus 100. Each row has n columns of patches 520 P1-1, P1-2, P1-3 . . . P1-n. That is, m×n patches 520 are arranged on one sheet. As described earlier, the color sensor 501 can move in the sheet width direction orthogonal to the sheet conveyance direction by the movable unit 530. The sheet 1 having its position detected by the conveyance path sensor 421 (refer to FIGS. 2 and 4) can be conveyed, stopped, or moved for a predetermined amount by the conveyance roller pairs 406 and 407 of the conveyance unit 460.

When conveying the sheet 1 to a position where the reading unit 501S of the color sensor 501 is arranged, as illustrated in FIG. 13A, the color sensor 501 stands by at a retracted position, i.e., outer position, retracted to the outer side of the sheet conveyance path, that is, the sheet discharge path 432, in the main scanning direction corresponding to the sheet width direction. In this state, as illustrated in FIG. 12A, the upstream guide shutter 601 and the downstream guide shutter 602 are arranged at opposed positions, that is, the shutters 601 and 602 form the sheet discharge path 432 together with the guide plate 620.

The conveyance roller pairs 406 and 407 are stopped after conveying the sheet 1 to a position where the reading unit 501S of the color sensor 501 is aligned with the position of the leading patch 520 of row P 1. In this state, the leading edge of the sheet 1 does not have to reach the conveyance roller pair 407. Thereafter, as illustrated in FIG. 12B, the upstream guide shutter 601 and the downstream guide shutter 602 are moved to the retracting position, that is, opened so as to allow the color sensor 501 to pass through. Then, as illustrated in FIG. 13B, the reading unit 501S of the color sensor 501 is moved in one direction of the main scanning direction and reads the n number of patches 520 P1-1 to P1-n on the leading row.

Thereafter, as illustrated in FIG. 13C, the color sensor 501 is positioned at the outer side of the sheet conveyance path, that is, the sheet discharge path 432, in the main scanning direction corresponding to the sheet width direction. Then, the conveyance roller pairs 406 and 407 convey the sheet 1 to a position where the reading unit 501S is aligned with the P2 row of patches 520, and then stops again. From this state, as illustrated in FIG. 13D, the reading unit 501S of the color sensor 501 is moved in the other direction of the main scanning direction (opposite to the direction of P1) and reads the n number of patches 520 P2-n to P2-1 in the row. Thereafter, a similar reading operation is repeated m times to read all the m×n number of patches 520. Note that when reading the patches 520 of the last row Pm, the trailing edge of the sheet 1 may have already passed through the conveyance roller pair 406. As described, by performing a read operation of the color sensor 501 in a state where the leading edge of the sheet 1 has not reached the conveyance roller pair 407 or in a state where the trailing edge of the sheet 1 has passed through the conveyance roller pair 406, the patches 520 formed on the entire area of the sheet 1 can be read.

After reading all the m×n number of patches 520, the color sensor 501 is positioned outside the sheet conveyance path, that is, the sheet discharge path 432, in the main scanning direction corresponding to the sheet width direction. Then, as illustrated in FIG. 12A, the upstream guide shutter 601 and the downstream guide shutter 602 are returned to their opposed positions, in other words, forms the sheet discharge path 432 together with the guide plate 620, and resumes conveyance of the sheet 1.

As illustrated in FIG. 13E, after reading the patches 520 of row P1, the reading unit 501S can be moved in the other direction, i.e., opposite direction, of the main scanning direction without conveying the sheet 1 in a stopped state and read the patches 520 P1- n to P1-1 of the leading row again. As described, the reading accuracy can be improved by reading the patches 520 on row P1 again by the color sensor 501.

As described, in a state where the color sensor 501 is moved in the main scanning direction, i.e., sheet width direction, to read the image information on the sheet, the upstream guide shutter 601 and the downstream guide shutter 602 are moved to the retracting positions. Then, when the sheet 1 is conveyed through the sheet discharge path 432, the upstream guide shutter 601 and the downstream guide shutter 602 are positioned at the opposed positions to form the sheet discharge path 432 together with the guide plate 620. In other words, the area of movement of the color sensor 501 is closed by the upstream guide shutter 601 and the downstream guide shutter 602. Thereby, the possibility of occurrence of sheet jamming can be reduced.

Second Embodiment

Next, a second embodiment in which a part of the first embodiment has been changed will be described with reference to FIG. 14. In the description of the second embodiment, similar portions as the first embodiment are denoted with the same reference numbers and descriptions thereof are omitted.

Figure 14A:
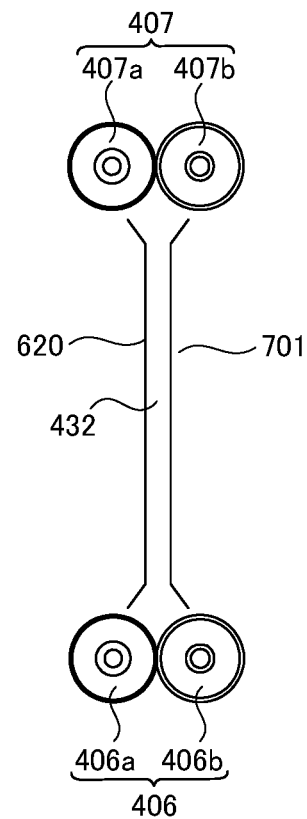
FIG. 14A is a side view illustrating a state where a movable guide shutter of a guide shutter device according to a second embodiment defines a sheet conveyance path.
Figure 14B:
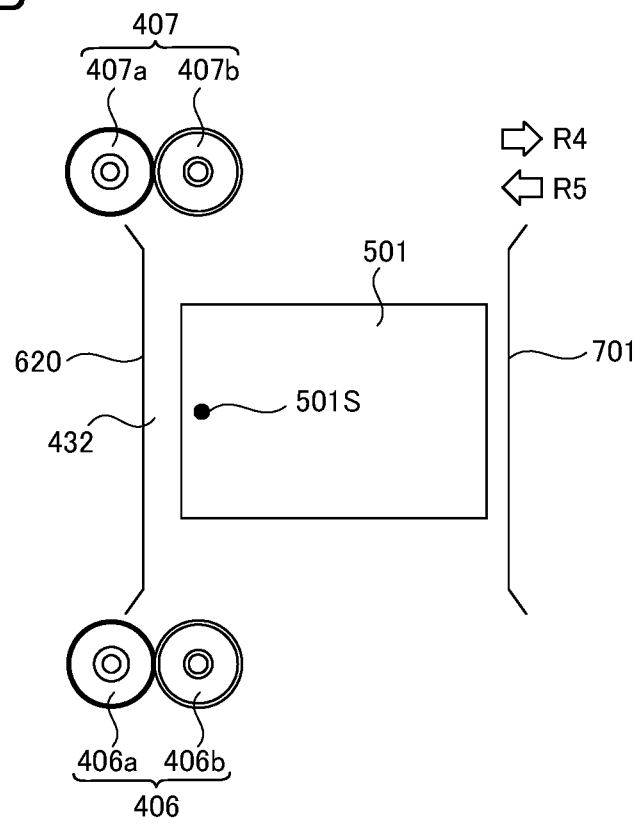
FIG. 14B is a side view illustrating a state where the movable guide shutter of the guide shutter device according to the second embodiment is retracted from the sheet conveyance path.

As illustrated in FIG. 14, the adjustment unit 400 according to the second embodiment includes a guide shutter 701 serving as a second conveyance guide or a parallel movement guide member between the conveyance roller pair 406 arranged upstream and the conveyance roller pair 407 arranged downstream in the sheet conveyance direction. The guide shutter 701 formed of a steel sheet having a thickness of 1 mm is movable to an opposed position opposed to the guide plate 620 immovably fixed and a retracting position being retracted from the opposed position. That is, the guide shutter 701 moves parallelly in slide movement to a direction orthogonal to the sheet conveyance direction and the sheet width direction, that is, to a direction moving toward or away from the guide plate 620, which are a direction denoted by arrow R4 or a direction denoted by arrow R5, by the drive of a shutter motor (not shown). The position of the guide shutter 701 is detected by providing a flag (not shown) to an end portion of the guide shutter 701 and a position detecting sensor (not shown) being turned on and off by the flag, wherein the position in which an on state is detected is set as the home position to perform pulse control.

Configurations and effects of the second embodiment other than those illustrated above are similar to those of the first embodiment, so descriptions thereof are omitted.

The first and second embodiments described above have illustrated a case where the image information on the sheet is read by the color sensor 501, but the present technique is not limited thereto, and any image reading unit, such as a monochrome image scanning sensor, can be adopted.

Further, the first and second embodiments described above have illustrated a case where the color sensor 501 reads patches while moving in one direction in the main scanning direction and thereafter reads patches while moving in the other direction, in other words, where the color sensor 501 reads patches in both directions while moving back and forth. However, the present disclosure is not limited to this example, and the color sensor can be designed to read patches only while moving in one direction or moving in the other direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-87090, filed May 19, 2020, which is hereby incorporated by reference herein in its entirety.

What is claimed is:

1. An image reading apparatus configured to read image information on a sheet discharged from an image forming apparatus that forms an image on a sheet, the image reading apparatus comprising:
   a first conveyance roller configured to convey a sheet;
   a second conveyance roller arranged downstream of the first conveyance roller in a sheet conveyance direction and configured to convey the sheet;
   a first conveyance guide configured to form a sheet conveyance path between the first conveyance roller and the second conveyance roller in the sheet conveyance direction;
   a second conveyance guide configured to move between an opposed position where the second conveyance guide is opposed to the first conveyance guide and forms the sheet conveyance path and a retracting position where the second conveyance guide retracts from the opposed position; and an image reading unit opposed to the first conveyance guide and configured to move in a width direction of the sheet, the width direction being orthogonal to the sheet conveyance direction, and configured to read image information on the sheet, wherein the second conveyance guide is at the retracting position when the image reading unit moves in the width direction and reads the image information on the sheet.

2. The image reading apparatus according to claim 1, wherein the image reading unit is configured to move to an outer position on an outer side of the sheet conveyance path in the width direction, and the second conveyance guide is configured to move to the opposed position in a state where the image reading unit is at the outer position.

3. The image reading apparatus according to claim 1, wherein the second conveyance guide is positioned at the opposed position until at least a sheet is conveyed by the first conveyance roller to a position where the image reading unit can read image information on the sheet.

4. The image reading apparatus according to claim 1, wherein the image reading unit includes a color sensor configured to read a color of image information on a sheet.

5. The image reading apparatus according to claim 1, wherein the image reading unit is configured to read image information on a sheet while moving in one direction in the width direction, and thereafter read the image information on the sheet while moving in the other direction in the width direction.

6. The image reading apparatus according to claim 1, wherein the image reading unit is configured to read the image information on an entire area of the sheet.

7. The image reading apparatus according to claim 1, wherein the second conveyance guide comprises:

an upstream rotary guide member configured to move by rotating an upstream guide surface configured to guide a sheet to the opposed position and to the retracting position with an upstream rotation shaft serving as fulcrum arranged upstream in the sheet conveyance direction of a position where the image reading unit moves in the width direction; and a downstream rotary guide member configured to move by rotating a downstream guide surface configured to guide a sheet to the opposed position and to the retracting position with a downstream rotation shaft serving as fulcrum arranged downstream in the sheet conveyance direction of the position where the image reading unit moves in the width direction.

8. The image reading apparatus according to claim 1, wherein the second conveyance guide comprises a parallel movement guide member configured to parallelly move an upstream guide surface configured to guide a sheet to the opposed position and to the retracting position.

9. An image forming system comprising:

an image forming portion configured to form an image on a sheet;

a first conveyance roller configured to convey the sheet on which is formed an image by the image forming portion;

a second conveyance roller arranged downstream of the first conveyance roller in a sheet conveyance direction and configured to convey the sheet;

a first conveyance guide configured to form a sheet conveyance path between the first conveyance roller and the second conveyance roller in the sheet conveyance direction;

a second conveyance guide configured to move between an opposed position where the second conveyance guide is opposed to the first conveyance guide and forms the sheet conveyance path and a retracting position where the second conveyance guide retracts from the opposed position; and an image reading unit opposed to the first conveyance guide and configured to move in a width direction of the sheet, the width direction being orthogonal to the sheet conveyance direction, and configured to read image information on the sheet, wherein the second conveyance guide is at the retracting position when the image reading unit moves in the width direction and reads the image information on the sheet.

10. The image forming system according to claim 9, wherein the image forming portion is configured to correct an image formed on a sheet based on image information read by the image reading unit.

11. The image forming system according to claim 9, wherein the image reading unit is configured to move to an outer position on an outer side of the sheet conveyance path in the width direction, and the second conveyance guide is configured to move to the opposed position in a state where the image reading unit is at the outer position.

12. The image forming system according to claim 9, wherein the second conveyance guide is positioned at the opposed position until at least a sheet is conveyed by the first conveyance roller to a position where the image reading unit can read image information on the sheet.

13. The image forming system according to claim 9, wherein the image reading unit includes a color sensor configured to read a color of image information on a sheet.

14. The image forming system according to claim 9, wherein the image reading unit is configured to read image information on a sheet while moving in one direction in the width direction, and thereafter read the image information on the sheet while moving in the other direction in the width direction.

15. The image forming system according to claim 9, wherein the image reading unit is configured to read the image information on an entire area of the sheet.

16. The image forming system according to claim 9, wherein the second conveyance guide comprises:

an upstream rotary guide member configured to move by rotating an upstream guide surface configured to guide a sheet to the opposed position and to the retracting position with an upstream rotation shaft serving as fulcrum arranged upstream in the sheet conveyance direction of a position where the image reading unit moves in the width direction; and a downstream rotary guide member configured to move by rotating a downstream guide surface configured to guide a sheet to the opposed position and to the retracting position with a downstream rotation shaft serving as fulcrum arranged downstream in the sheet conveyance direction of the position where the image reading unit moves in the width direction.

17. The image forming system according to claim 9, wherein the second conveyance guide comprises a parallel movement guide member configured to parallelly move an upstream guide surface configured to guide a sheet to the opposed position and to the retracting position.

\* \* \* \* \*